United States Patent [19]

Siegmund

[11] 3,902,879
[45] Sept. 2, 1975

[54] METHOD OF MAKING OPTICAL FIBER WITH POROUS CLADDING

[75] Inventor: Walter P. Siegmund, Woodstock, Conn.

[73] Assignee: American Optical Corporation, Southbridge, Mass.

[22] Filed: Mar. 22, 1974

[21] Appl. No.: 453,736

Related U.S. Application Data

[62] Division of Ser. No. 284,189, Aug. 28, 1972.

[52] U.S. Cl. ................. 65/3; 65/4; 65/13; 65/DIG. 7; 117/126 GF; 350/96 WG
[51] Int. Cl.² .......................................... C03B 37/02
[58] Field of Search .............. 65/4, 13, 3, DIG. 7; 350/96 WG, 96 B; 117/126 GF

[56] References Cited
UNITED STATES PATENTS

| 3,278,283 | 10/1966 | Bazinet ..................................... 65/4 |
| 3,554,721 | 1/1971 | Gardner ........................... 65/DIG. 7 |
| 3,677,730 | 7/1972 | Deradorian et al. ................... 65/4 X |
| 3,678,328 | 7/1972 | Cross ............................... 350/96 B X |

*Primary Examiner*— Robert L. Lindsay, Jr.
*Attorney, Agent, or Firm*—H. R. Berkenstock, Jr.; William C. Nealon

[57] ABSTRACT

Improving the light-transmitting efficiency of a clad light-conducting fiber by minimizing core-cladding interfacial defects. Elongated open channels extending longitudinally of the fiber are formed within the cladding to cushion the expansion of gases existing and/or created along the fiber core-cladding interface during fabrication of the fiber.

4 Claims, 5 Drawing Figures

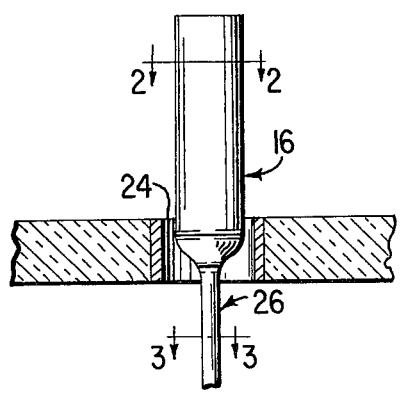
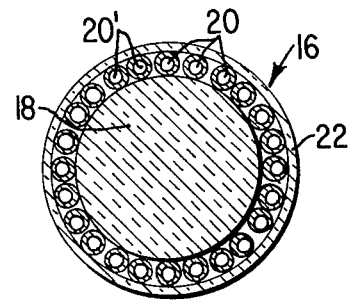
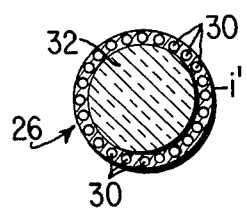
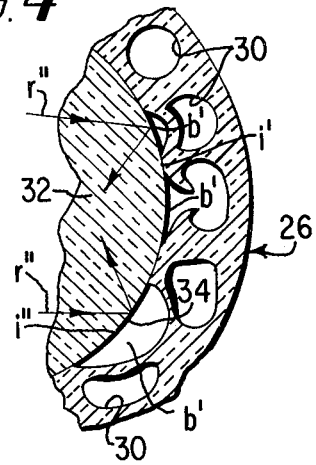
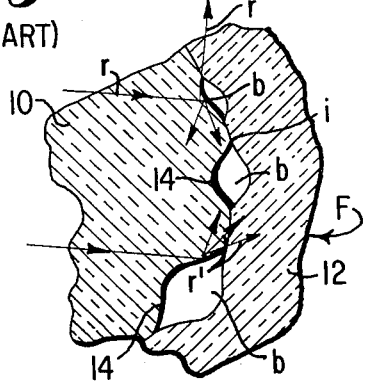

METHOD OF MAKING OPTICAL FIBER WITH POROUS CLADDING

This is a division, of application Ser. No. 284,189, filed Aug. 28, 1972.

BACKGROUND OF THE INVENTION

1. Field of the Invention:

Fiber optics with particular reference to improvements in the construction and method of making clad light-conducting fibers.

2. Description of the Prior Art:

A serious problem in fiber optics is the occurrence of blemishes in cores of clad optical fibers which result from gas bubbles along their core-cladding interfaces. Indentation of fiber cores by the expansion of entrapped gases during fabrication of the fibers causes deflection or scattering of substantial amounts of light at their respective core-cladding interfaces with an attending loss through sides of the fibers and the consequence of significantly reduced end-to-end transmission.

The use of softer or lower melting temperature second cladding material for the usual purpose of avoiding distortion of overall fiber shape as explained in U.S. Pat. No. 3,253,896, has little, if any, influence upon the reduction of fiber core gas bubble distortion unless the soft cladding material is used immediately adjacent to the fiber core as suggested in U.S. Pat. No. 3,653,739, for example. Even so, these materials alone lack cushioning capabilities sufficient to overcome the full distortion effect of entrapped or induced interfacial gases upon optical fiber cores.

The present invention has for an objective the avoidance of fiber core distortion in the manufacture of clad optical fibers and devices formed thereof. The invention is applicable to all useful fiber cladding materials whether characteristically softer or of similar softening points to those of fiber core materials with which they are used.

SUMMARY OF THE INVENTION

This invention accomplishes its objective by producing a porous relatively low refractive index cladding upon the normal higher refractive index cores of optical fibers. The cladding in each case has a series of open channels extending along its length.

Whether the cladding material has a softening temperature which is lower or similar to that of the fiber core material, the main cushioning effect thereof is provided by the atmosphere or partial vacuum within the channels. This, in conjunction with its relatively thin surrounding walls of cladding material permits the walls to readily flex inwardly against or into the cushioning atmosphere of the channels in response to interfacial gas bubble pressure during fabrication of this fiber. This preferential distortion of cladding material prevents indentation or surface distortion of the relatively heavy mass of fiber core material. A fiber cladding of lower softening temperature material than that of its respective core will enhance the cushioning of interfacial bubbles.

The invention will be more fully understood by reference to the following detailed description when taken in conjunction with the accompanying drawings.

DESCRIPTION OF THE DRAWINGS

FIG. 1 is a diagrammatic illustration of a method of drawing optical fiber from an assembly of fiber core and cladding materials;

FIG. 2 illustrates a greatly enlarged transverse cross-section of the assembly of materials taken along line 2—2 of FIG. 1 and from which a fiber may be drawn according to the present invention;

FIG. 3 is a similarly greatly enlarged transverse cross-sectional view of a fiber drawn from the assembly of components shown in FIGS. 1 and 2, the cross-section being taken along line 3—3 of FIG. 1;

FIG. 4 is a still further enlarged cross-sectional view of a portion of the fiber shown in FIG. 3 diagrammatically illustrating a principle feature of the invention in overcoming prior art problems of fiber core distortion; and FIG. 5 is a fragmentary cross-sectional view of a prior art glass-clad glass optical fiber illustrating interfacial defects of the type dealt with and overcome by the present invention.

DESCRIPTION OF THE PREFERRED EMBODIMENTS

With reference to the drawings, it can be seen that this invention relates to the manufacture of optical fibers having cores of high refractive index material surrounded by claddings of lower refractive index material which, together, produce an internally reflective core-cladding interface making the resultng fiber conductive to light according to the well known principles of total internal reflection. For those interested in details of these principles, reference may be made to U.S. Pat. Nos. 2,825,260; 3,395,994 and 3,653,739.

It will also become more readily apparent hereinafter that this invention is especially applicable to the manufacture of glass optical fibers but not to the exclusion of fibers formed of other materials including fused quartz and plastics.

Exemplary of the types of fiber making techniques and processes to which the improvement of this invention is particularly applicable are those shown and described in U.S. Pat. Nos. 2,980,957 and 3,037,241 wherein a fiber core material in rod form is placed within a sleeve or tube of fiber cladding material to form an assembly which may be heated and drawn to fiber size.

While vacuum has been applied between rod and tube components of such as the aforementioned prior art assemblies, and special care has been taken for initiating and maintaining cleanliness of external and internal surfaces of the rod and tube components during processing, the entrappment of gases and outgasing of fiber core or cladding materials and/or foreign matter thereon during fusion has been found to be unavoidable. Thus gas bubble interfacial blemishes have heretofore continued to create serious problems of high scrap yield and generally inferior end product results in clad optical fiber production.

This blemish problem is illustrated in FIG. 5 of the present drawings for purposes of more clearly illustrating the novel and improved end result of the present invention.

Referring more particularly to FIG. 5, gas bubbles $b$ of various exemplary, but somewhat exagereted, sizes and shapes are illustrated along interface $i$ between core 10 and cladding 12 of prior art fiber F. These entrapped bubbles $b$ create indentations or depressions 14 in the surface of core 10 which indentations are of irregular shapes and sizes corresponding to the overall bubble shape and size.

As it is well known in the fiber optic art and explained in the aforementioned exemplary U.S. patents, a smooth internally reflective surface along an optical fiber core 10 is required for optimum transmission of light therealong by total internal reflection. With each incidence of a ray of light against interface $i$, its continued conductance through fiber F requires that it reflect from interface $i$ within the critical angle of reflection for the particular interface. Thus, for exemplary rays $r$ (FIG. 5) normally directed toward interface $i$ within its critical angle of reflection, the striking of these rays $r$ against the imperfections of indentations 14 caused by gas bubbles $b$ scatters these rays $r$ in directions outwardly of, or beyond the normal critical angle of reflection for interface $i$. This scattering is depicted with arrows $r'$ representing light rays which become lost through sides of fiber F as stray light, thereby diminishing end-to-end transmission of light through core 10 of fiber F.

According to the present invention, it is contemplated that clad optical fibers be formed by generally conventional assembling and drawing techniques, one of which is diagrammatically illustrated in FIG. 1. Therein, assembly 16 includes a central rod 18 (FIG. 2) of a suitable relatively high refractive index light-conducting material (e.g., optical flint glass having a refractive index of approximately 1.75). Immediately adjoining rod 18 and extending along the full length of its sides are tubes 20 of a lower refractive index cladding material which are held in place by an outer surrounding sleeve 22 preferably formed of the same material as that used for tubes 20 (e.g., crown glass having a refractive index of approximately 1.52).

The assembly 16 is suspended in the usual manner above a suitable, preferably annular, heating element 24, heated and drawn longitudinally into fiber 26. Those interested in greater details of the apparatus and procedure normally used for drawing optical fiber as just described may refer to the aforementioned U.S. Pat. Nos. 2,980,957 and 3,037,241.

Fiber 26, as shown in FIG. 3, comprises the fused combination of all components 18, 20 and 22 in substantially proportionate dimensions and shapes but all considerably reduced in size. Tubes 20 and sleeve 22, preferably being of identical materials, produce an amorphous outer cladding 28 having pores 30 extending therethrough in corresponding positional relationship to lumens 20' of tubes 20 in assembly 16. Cladding 28 is fused to core 32 of fiber 26 thereby forming internally reflective interface $i'$.

The purpose and function of pores 30 can best be understood by reference to FIG. 4 when considered with the already described illustration of prior art fiber F in FIG. 5.

In the case of fiber 26 (FIG. 4), entrapped gas bubbles 14' which have been shown in corresponding positions, shapes and sizes to exemplary bubbles 14 of FIG. 5, are prevented from causing appreciable, if any, indentation of outer surface 34 of fiber core 32 by a cushioning effect afforded by pores 30 in cladding 28. These pores 30 allow their relatively thin, low mass walls to expand or become pushed into them with considerably less force of bubble gas pressure than would be required to indent surface 34 of core 32. Thus, exemplary light rays $r''$ which are similar to rays $r$ of FIG. 5, will strike the bubble 14' gas-core 32 portion of interface $i'$ within the critical angle of reflection of this interface and become reflected back internally of core 32 for continued transmission through fiber 26 and enhanced transmission of light.

The cushioning effect of pores 30 may become manifested in various ways, three of which have been shown in FIG. 4. In one case, a gas bubble $b'$ may merely deflect part of the cladding material 28 into an adjacent pore 30 as shown in the illustration of the uppermost gas bubble in FIG. 4. Alternatively, a bubble $b'$ may rupture the relatively thin section of cladding material 28 causing the bubble gas to escape into pore 30 as shown in centermost bubble of the FIG. 4 illustration. Still another effect is shown in the lowermost illustration of the largest bubble in FIG. 4 wherein the much larger interfacial gas bubbles may be cushioned by two or more pores 30 which yield to indentation of sections of cladding material 28 toward and into both with or without rupturing of the material 28. In all cases, outer surface 34 of core 32 is maintained substantially undistorted for optimum transmission of light by total internal reflection therealong either by the effect of a relatively high-to-low refractive index differential of core-clad material or a similar relatively high-to-low refractive index differential of core-air or gas interface at location of bubbles $b'$.

It should be understood that fibers 26 formed according to this invention are readily adaptable to bundling together and use in all of the various fiber optic devices of the trade. While fibers of circular cross-section and having pores 30 also circular in cross-section have been shown in the drawings for purposes of illustration, it should be understood that rectangular, hexagonal and any or all of other cross-sectional shapes used in the art that may be fabricated according to principles of this invention. The invention is not to be limited to any particular one or more cross-sectional shapes nor to the circular shape of pores 30 which may, alternatively, be rectilinear in either circular or rectilinearly shaped fibers.

Bundling of any of the aforementioned types of fibers together in the fabrication of devices requiring vacuum tightness would be no exception to their use in the fiber optic devices. Pores 30 of fibers 26 would automatically become closed and sealed during the usual fiber bundle compressing operation used in the making of most vacuum tight fiber optic plates and other such devices.

I claim:

1. The method of making a fused completely circumferentially clad optical fiber having a succession of longitudinally extending spaces disposed circumferentially about said fiber within the cladding, comprising, the steps of:

placing a rod of relatively high refractive index light-conducting material centrally within a sleeve of relatively low refractive index material having an internal diametral dimension substantially greater than the external diametral dimension of said rod thereby leaving a substantial space completely circumferentially about said centrally disposed rod; and placing a series of tubes of relatively low refractive index material longitudinally in said space throughout the circumferential extension thereof, said tubes being disposed in juxtaposed relationship with each other;

heating one end of the assembly of said rod, sleeve and tubes to a fusing and drawing temperature; and drawing said assembly longitudinally into a fiber thereby causing said rod, sleeve and tubes to fuse together as an integral unit having a core and cladding comprised respectively of said rod materials and the fused combination of said sleeve and tube materials, said cladding having porosities extending longitudinally therethrough in corresponding positional relationship and approximate proportionate side to respective locations and sizes of said tubes in said initial assembly.

2. The method according to claim 1 further including the step of radially inwardly compressing said fiber over a short portion of its length sufficiently to close and seal said openings at said portion of said fiber length.

3. The method according to claim 1 further including the step of severing said fiber laterally into a number of relatively short lengths thereof, bundling said lengths of fiber in juxtaposed relationship and connecting together said lengths of fiber of said bundle.

4. The method according to claim 3 further including the step of compressing said bundle radially inwardly along at least one relatively short portion of its length sufficiently to close and seal said openings in said fibers throughout said length of the bundle.

* * * * *